3,280,101
6-CYANOALKYLSULFONYLBENZOTHIAZOLE
MONOAZO DYESTUFFS
James M. Straley and John G. Fisher, Kingsport, Tenn., assignors to Eastman Kodak Company, Rochester, N.Y., a corporation of New Jersey
No Drawing. Filed Sept. 7, 1962, Ser. No. 222,187
11 Claims. (Cl. 260—158)

This invention relates to new azo compounds and their application to the art of dyeing or coloring.

We have discovered that the monoazo compounds having the general formula:

(I)

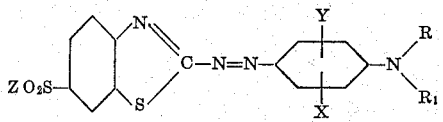

wherein R represents a hydrogen atom, an alkyl group having 1 to 4 carbon atoms, a hydroxylkyl group having 2 to 4 carbon atoms, an alkoxyalkyl group having 3 to 4 carbon atoms, a cyanoalkyl group having 3 to 5 carbon atoms, $\beta$-acetoxyethyl, carbomethoxy-methyl, carboethoxymethyl, $\beta$-carbomethoxyethyl or $\beta$-carboethoxyethyl, $R_1$ represents a hydrogen atom, an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, $\beta$-acetoxyethyl, carbomethoxymethyl, carboethoxymethyl, $\beta$-carbomethoxyethyl, $\beta$-carboethoxyethyl, $\beta$-phenylureidoethyl, $\gamma$-chloro-$\beta$-hydroxypropyl, $\beta,\beta$-difluoroethyl, $\beta,\beta$-difluoro-n-propyl, $\gamma,\gamma$-difluoropropyl, $\beta,\beta,\beta$-trifluoroethyl, $\gamma,\gamma,\gamma$-trifluoropropyl, a $$-CH_2CH_2\overset{H}{\underset{\underset{O}{\|}}{N}}Calkyl\ (1\ to\ 2)\ group$$

a $\beta$-alkyl(1 to 4)sulfonamidoethyl group or a $\beta$-alkyl(1 to 4)carbamoylethyl group, X represents a hydrogen atom, a bromine atom, a chlorine atom, methyl, ethyl, methoxy, ethoxy, acetylamino, n-propionylamino or n-butyrylamino, Y represents a hydrogen atom, methyl, ethyl, methoxy or ethoxy and Z represents a cyanoalkyl group having 2 to 5 carbon atoms are valuable dyes for cellulose carboxylic acid ester, having 2 to 4 carbon atoms in the acid groups thereof, materials and linear polyester materials. They yield bright dyeings on textile materials made of said materials which have good to excellent fastness to light, gas, washing and sublimation.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new monoazo compounds of our invention are prepared by diazotizing a 2-amino-6-cyanoalkylsulfonylbenzothiazole compound having the formula:

(II)

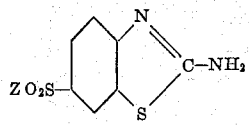

wherein Z represents a cyanoalkyl group having 2 to 5 carbon atoms and coupling the diazonium compound obtained with a compound having the formula:

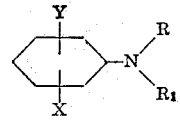

wherein R, $R_1$, X and Y have the meaning previously assigned to them.

The new monoazo compounds of our invention can also be prepared by first preparing the azo compounds having the formula:

(III)

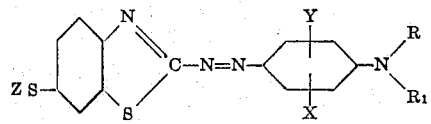

wherein R, $R_1$, X, Y and Z have the meaning previously assigned to them and oxidizing these compounds to the compounds having the Formula I. The oxidation can be carried out by known means for oxidizing a thio compound to a sulfonyl compound. The oxidation can be carried out, for example, by oxidizing the thio compound with hydrogen peroxide in an organic acid medium such as acetic acid.

Illustrative of the alkyl groups represented by R and $R_1$ are the methyl, the ethyl, the n-propyl, the isopropyl and the n-butyl groups. Similarly, the $\beta$-hydroxyethyl, the $\beta$-hydroxypropyl, the $\beta,\gamma$-dihydroxypropyl, the $\beta$-methyl - $\beta,\gamma$ - dihydroxypropyl and the $\delta$-hydroxybutyl groups are illustrative of the hydroxyalkyl groups R and $R_1$ represent. Illustrative of the alkoxyalkyl groups represented by R and $R_1$ are the $\beta$-methoxyethyl and the $\beta$-ethoxyethyl groups. Similarly, the $\beta$-cyanoethyl, the $\gamma$-cyanopropyl and the $\delta$-cyanobutyl group are illustrative of the cyanoalkyl groups R and $R_1$ represent.

Kodel and Dacron are illustrative of the linear polyester materials that can be dyed. Both of these materials have a melting point of at least 200° C. and our invention, as applied to the dyeing of linear polyesters, is particularly directed to the dyeing of such polyesters having a melting point of at least 200° C. although linear polyesters having a melting point less than 200° C. also can be dyed.

The materials dyed with our new azo compounds are ordinarily in the form of a textile material. The textile material can be in any desired form, such as fiber, filament, yarn or fabric, for example.

The 2-amino-6-cyanoalkylsulfonylbenzothiazole compounds used in preparing the valuable new azo compounds of our invention are for the most part known compounds. They can be prepared by oxidation of the corresponding 2- amino - 6 - cyanoalkylthiobenzothiazole compounds using known procedures. Oxidation can be carried out, for example, with hydrogen peroxide in the presence of acetic acid.

2-amino-6-$\beta$-cyanoethylthiobenzothiazole, 2-amino-6-$\beta$-cyanoethylsulfonylbenzothiazole, 2 - amino - 6 - $\beta$ - cyanopropylthiobenzothiazole, 2-amino - 6-$\beta$-cyanopropylsulfonylbenzothiazole, 2 - amino - 6-$\gamma$-cyanopropylthiobenzothiazole and 2-amino-6-$\gamma$-cyanopropylsulfonylbenzothiazole are either specifically described or indicated in our U.S. Patent 2,916,482.

The following examples illustrate our invention.

EXAMPLE 1.—PREPARATION OF 2-AMINO-6-β-CYANOETHYLSULFONYLBENZOTHIAZOLE 74 cc. of 30% hydrogen peroxide were added slowly to a solution of 20 grams of 2-amino-6-β-cyanoethylthiobenzothiazole in 100 cc. of acetic acid at 70–80° C. The reaction mixture was held at this temperature 30 minutes after addition, then drowned in 400 cc. of water The 2-amino-6-β-cyanoethylsulfonylbenzothiazole formed was filtered off, washed with water and dried. It has a melting point of 219–221° C.

EXAMPLE 2.—PREPARATION OF 2-AMINO-6-β-CYANOETHYLTHIOBENZOTHIAZOLE 50 grams of 2-amino-6-thiocyanobenzothiazole and 58 grams of $Na_2S \cdot 9H_2O$ were heated in 360 cc. of ethanol at reflux for 15 minutes. 21.6 grams of 2-chloropropionitrile were added during 15 minutes and refluxing was continued for 1 hour. The mix was then poured into 1800 cc. of water. The 2-amino-6-β-cyanoethylthiobenzothiazole formed was filtered off, washed with water and dried. It has a melting point of 164–167° C.

EXAMPLE 3.—PREPARATION OF 2-AMINO-6-δ-CYANOBUTYLSULFONYLBENZOTHIAZOLE

Example 2 was repeated using 28.2 grams of 4-chloro-1-cyanobutane in place of 2-chloropropionitrile. 2-amino-6-δ-cyanobutylthiobenzothiazole melting at 91–93° C. was obtained. Upon oxidation of the 2-amino-6-δ-cyanobutylthiobenzothiazole in accordance with the procedure described in Example 1, 2-amino-6-δ-cyanobutylsulfonylbenzothiazole melting at 122–124° C. was obtained.

EXAMPLE 4.—PREPARATION OF 2-AMINO-6-CYANOMETHYLSULFONYLBENZOTHIAZOLE

A solution of 5.3 grams of bromine in 9 ccs. of acetic acid was added, with stirring, to a mixture of 6.51 grams of p-aminophenylcyanomethylsulfone (J. Chem. Soc., 1945, p. 566) in 50 ccs. of acetic acid at such a rate that the temperature did not exceed 35° C. The reaction mixture was stirred overnight and then the yellow solid which precipitated was recovered by filtration. The yellow precipitate thus obtained was dissolved in 100 ccs. of water, filtered, and sodium acetate was added to the filtrate until no more solid precipitated. The 2-amino-6-cyanomethylsulfonylbenzothiazole thus formed was recovered by filtration, washed and dried. It has a melting point of 237–239° C. (dec.).

2-amino-6-cyanomethylsulfonylbenzothiazole can also be prepared by treating 2-amino-6-mercaptobenzothiazole with chloroacetonitrile to obtain 2-amino-6-cyanomethylthiobenzothiazole which is then oxidized to 2-amino-6-cyanomethylsulfonylbenzothiazole by treatment with 30% hydrogen peroxide in the presence of acetic acid.

EXAMPLE 5

67 grams of 2-amino-6-β-cyanoethylsulfonylbenzothiazole were dissolved in 1250 grams of 50% sulfuric acid. The resulting solution was cooled to −10° C. and a solution of 17.5 grams of sodium nitrite in 125 grams of concentrated sulfuric acid was added, with stirring, while maintaining the temperature below −3° C. The reaction mixture was then stirred at −5° C. to 0° C. until diazotization was complete and then added, with stirring, to a solution of 47 grams of N-ethyl-N-β-cyanoethyl-m-toluidine in 1250 grams of 10% sulfuric acid at −5° C. After addition, the reaction mixture was allowed to stand 2 hours without further cooling and then filtered. The solid collected on the filter was stirred in 6000 cc. of water for 30 minutes, after which the purified solid (reaction product) was recovered by filtration, washed with water and dried. The azo compound obtained has the formula:

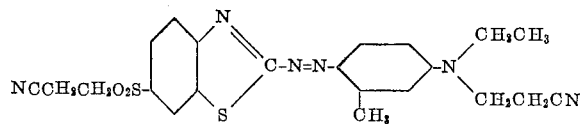

It dyes Dacron 54 polyester textile materials bright, red fast shades. It dyes cellulose acetate textile materials somewhat bluer shades of red.

EXAMPLE 6

67 grams of 2-amino-6-β-cyanoethylsulfonylbenzothiazole were diazotized and the diazonium compound obtained was coupled with 43.5 grams of N-ethyl-N-β-cyanoethylaniline. Diazotization, coupling and recovery of the azo compound formed were carried out in accordance with the procedure described in Example 5. The azo compound obtained dyes Dacron 54 polyester textile materials bright red fast shades and cellulose acetate textile materials somewhat bluer shades of red.

EXAMPLE 7

67 grams of 2-amino-6-β-cyanoethylsulfonylbenzothiazole were diazotized and the diazonium compound obtained was coupled with 58 grams of N-β-acetoxyethyl-N-β-cyanoethylaniline. Diazotization, coupling and recovery of the azo compound formed were carried out in accordance with the procedure described in Example 5. The azo compound obtained dyes Dacron 54 polyester textile materials bright red fast shades and cellulose acetate textile materials somewhat bluer shades of red.

EXAMPLE 8

67 grams of 2-amino-6-β-cyanoethylsulfonylbenzothiazole were diazotized and the diazonium compound obtained was coupled with 61.5 grams of N-β-acetoxyethyl-N-β-cyanoethyl-m-toluidine. Diazotization, coupling and recovery of the azo compound formed were carried out in accordance with the procedure described in Example 5. The azo compound obtained dyes Dacron 54 polyester textile materials bright red fast shades and cellulose acetate textile materials somewhat bluer shades of red.

EXAMPLE 9

67 grams of 2-amino-6-β-cyanoethylsulfonylbenzothiazole were diazotized and the diazonium compound obtained was coupled with 47.5 grams of N-β-hydroxyethyl-N-β-cyanoethylaniline. Diazotization, coupling and recovery of the azo compound formed were carried out in accordance with the procedure described in Example 5. The azo compound obtained dyes Dacron 54 polyester textile materials bright red fast shades and cellulose acetate textile materials somewhat bluer shades of red.

EXAMPLE 10

67 grams of 2-amino-6-β-cyanoethylsulfonylbenzothiazole were diazotized and the diazonium compound obtained was coupled with 50.5 grams of N,N-di-β-cyanoethylaniline. Diazotization, coupling and recovery of the azo compound formed were carried out in accordance with the procedure described in Example 5. The azo compound obtained dyes Dacron 54 polyester textile materials bright scarlet fast shades and cellulose acetate textile materials substantially the same color.

EXAMPLE 11

67 grams of 2-amino-6-β-cyanoethylsulfonylbenzothiazole were diazotized and the diazonium compound obtained was coupled with 40 grams of N-β-cyanoethyl-o-toluidine. Diazotization, coupling and recovery of the azo compound formed were carried out in accordance with the procedure described in Example 5. The azo compound obtained dyes Dacron 54 polyester textile materials bright orange fast shades and cellulose acetate textile materials substantially the same color.

EXAMPLE 12

A solution of 18 grams of sodium nitrite in 125 grams of concentrated sulfuric acid was added to 250 grams of acetic-propionic acid (6:1) below 5° C. 63.3 grams of 2-amino-6-cyanomethylsulfonylbenzothiazole were then added, with stirring, and the reaction mixture was diluted slowly with 800 grams of acetic-propionic acid (6:1) below 10° C. The diazonium mixture thus prepared was run slowly into a solution of 66.3 grams of N, N-di (β-acetoxyethyl) aniline in 1000 grams of acetic-propionic acid (6:1). The mineral acid present was made neutral to Congo red paper by the addition of ammonium acetate and the reaction mixture was then held at 5° C. for 2 hours, with stirring. The reaction mixture was then poured into 20 times' its volume of cold water and the reaction product which precipitated was recovered by filtration, washed with water and dried. The azo compound thus obtained dyes linear polyester textile materials, such as Dacron 54 and Kodel bright fast red shades. It dyes cellulose acetate textile materials substantially the same color.

The term "acetic-propionic acid (6:1)" as used herein refers to an acetic-propionic acid mixture containing 6 parts by volume of acetic acid to 1 part by volume of propionic acid.

EXAMPLE 13

63.3 grams of 2-amino-6-cyanomethylsulfonylbenzothiazole were diazotized and the diazonium compound obtained was coupled with 51.3 grams of N-N-n-butyl-N-β-methoxyethylaniline. Diazotization, coupling and recovery of the azo compound formed were carried out in accordance with the procedure described in Example 12. The azo compound thus obtained dyes linear polyester textile materials, such as Dacron 54 and Kodel bright fast red shades. It dyes cellulose acetate textile materials substantially the same color.

EXAMPLE 14

63.3 grams of 2-amino-6-cyanomethylsulfonylbenzothiazole were diazotized and the diazonium compound obtained was coupled with 44 grams of N-methyl-N-β-cyanoethyl-m-toluidine. Diazotization, coupling and recovery of the azo compound formed were carried out in accordance with the procedure described in Example 12. The azo compound thus obtained dyes linear polyester textile materials, such as Dacron 54 and Kodel bright fast red shades. It dyes cellulose acetate textile materials substantially the same color.

EXAMPLE 15

63.3 grams of 2-amino-6-cyanomethylsulfonylbenzothiazole were diazotized and the diazonium compound obtained was coupled with 60.3 grams of N-ethyl-N-β-carbomethoxyethyl-m-chloroaniline. Diazotization, coupling and recovery of the azo compound formed were carried out in accordance with the procedure described in Example 12. The azo compound thus obtained dyes linear polyester textile materials, such as Dacron 54 and Kodel bright fast red shades. It dyes cellulose acetate textile materials substantially the same color.

EXAMPLE 16

63.3 grams of 2-amino-6-cyanomethylsulfonylbenzothiazole were diazotized and the diazonium compound obtained was coupled with 53.3 grams of N-ethyl-N-(γ-chloro-β-hydroxypropyl) aniline. Diazotization, coupling and recovery of the azo compound formed were carried out in accordance with the procedure described in Example 12. The azo compound thus obtained dyes linear polyester textile materials, such as Dacron 54 and Kodel bright fast red shades. It dyes cellulose acetate textile maerials substantially the same color.

EXAMPLE 17

63.3 grams of 2-amino-6-cyanomethylsulfonylbenzothiazole were diazotized and the diazonium compound obtained was coupled with 46.3 grams of N-β-hydroxyethyl-N-(β, β-difluoroethyl) aniline. Diazotization, coupling and recovery of the azo compound formed were carried out in accordance with the procedure described in Example 12. The azo compound thus obtained dyes linear polyester textile materials, such as Dacron 54 and Kodel bright fast red shades. It dyes cellulose actetate textile materials substantially the same color.

EXAMPLE 18

71 grams of 2-amino-6-β-cyanopropylsulfonylbenzothiazole were diazotized and the diazonium compound obtained was coupled with 45.3 grams of N,N-diethyl-m-anisidine. Diazotization, coupling and recovery of the azo compound formed can be carried out in accordance with the procedure set forth in either Example 5 or 12. The azo compound obtained colors linear polyester textile materials, such as Dacron 54 and Kodel, bright fast bluish-red shades. It dyes cellulose acetate textile materials substantially the same color.

EXAMPLE 19

71 grams of 2-amino-6-β-cyanopropylsulfonylbenzothiazole were diazotized and the diazonium compound obtained was coupled with 55.5 grams of N-β-hydroxyethyl-N-ethyl-m-acetamidoaniline. Diazotization, coupling and recovery of the azo compound formed can be carried out in accordance with the procedure set forth in either Example 5 or 12. The azo compound obtained colors linear polyester textile materials, such as Dacron 54 and Kodel, bright fast violet shades. It dyes cellulose acetate textile materials substantially the same color.

EXAMPLE 20

71 grams of 2-amino-6-β-cyanopropylsulfonylbenzothiazole were diazotized and the diazonium compound obtained was coupled with 63.5 grams of N-β, γ-dihydroxypropyl-2-methoxy-5-acetylaminoaniline. Diazotization, coupling and recovery of the azo compound formed can be carried out in accordance with the procedure set forth in either Example 5 or 12. The azo compound obtained colors linear polyester textile materials, such as Dacron 54 and Kodel, bright fast violet shades. It dyes cellulose acetate textile materials substantially the same color.

EXAMPLE 21

71 grams of 2-amino-6-β-cyanopropylsulfonylbenzothiazole were diazotized and the diazonium compound obtained was coupled with 64 grams of N-β-methylsulfonamidoethyl-N-ethyl-m-toluidine. Diazotization, coupling and recovery of the azo compound formed can be carried out in accordance with the procedure set forth in either Example 5 or 12. The azo compound obtained colors linear polyester textile materials, such as Dacron 54 and Kodel, bright fast bluish-red shades. It dyes cellulose acetate textile materials substantially the same color.

EXAMPLE 22

71 grams of 2-amino-6-β-cyanopropylsulfonylbenzothiazole were diazotized and the diazonium compound obtained was coupled with 60.5 grams of N-β-propionylamidoethyl-N-ethyl-m-toluidine. Diazotization, coupling and recovery of the azo compound formed can be carried out in accordance with the procedure set forth in either Example 5 or 12. The azo compound obtained colors linear polyester textile materials, such as Dacron 54 and Kodel, bright fast bluish-red shades. It dyes cellulose acetate textile materials substantially the same color.

EXAMPLE 23

67 grams of 2-amino-6-β-cyanoethylsulfonylbenzothiazole were diazotized and the diazonium compound obtained was coupled with 64 grams of N-β-methylsulfonamidoethyl - N - ethyl - m - toluidine. Diazotization, coupling and recovery of the azo compound formed were carried out in acordance with the procedure set forth in Example 12. The azo compound obtained dyes linear polyester textile materials, such as Dacron 54 and Kodel, bright fast bluish-red shades. It dyes cellulose acetate textile materials substantially the same color.

EXAMPLE 24

67 grams of 2-amino-6-β-cyanoethylsulfonylbenzothiazole were diazotized and the diazonium compound obtained was coupled with 70.8 grams of N-β-phenylureidoethyl-N-ethylaniline. Diazotization, coupling and recovery of the azo compound formed were carried out in accordance with the procedure set forth in Example 12. The azo compound obtained dyes linear polyester textile materials, such as Dacron 54 and Kodel, bright fast red shades. It dyes cellulose acetate textile materials substantially the same color.

EXAMPLE 25

67 grams of 2-amino-6-β-cyanoethylsulfonylbenzothiazole were diazotized and the diazonium compound obtained was coupled with 27 grams of m-toluidine. Diazotization, coupling and recovery of the azo compound formed were carried out in accordance with the procedure set forth in Example 12. The azo compound obtained dyes linear polyester textile materials, such as Dacron 54 and Kodel, bright fast scarlet shades. It dyes cellulose acetate textile materials substantially the same color.

EXAMPLE 26

67 grams of 2-amino-6-β-cyanoethylsulfonylbenzothiazole were diazotized and the diazonium compound obtained was coupled with 51 grams of N-β-cyanoethyl-N-β-methoxyethylaniline. Diazotization, coupling and recovery of the azo compound formed were carried out in accordance with the procedure set forth in Example 12. The azo compound obtained dyes linear polyester textile materials, such as Dacron 54 and Kodel, bright fast red shades. It dyes cellulose acetate textile materials substantially the same color.

EXAMPLE 27

67 grams of 2-amino-6-β-cyanoethylsulfonylbenzothiazole were diazotized and the diazonium compound obtained was coupled with 69.5 grams of N-ethyl-N-β-n-butylcarbamoylethyl - m - toluidine. Diazotization, coupling and recovery of the azo compound formed were carried out in accordance with the procedure set forth in Example 12. The azo compound obtained dyes linear polyester textile materials, such as Dacron 54 and Kodel, bright fast red shades. It dyes cellulose acetate textile materials substantially the same color.

EXAMPLE 28

74 grams of 2-amino-6-(δ-cyanobutylsulfonyl)benzothiazole were diazotized and the diazonium compound obtained was coupled with 43.5 grams of N-ethyl-N-β-chloroethylaniline. Diazotization, coupling and recovery of the azo compound formed can be carried out in accordance with the procedure described in either Example 5 or Example 12. The azo compound obtained dyes linear polyester textile materials, such as Dacron 54 or Kodel, fast bright red shades. It dyes cellulose acetate textile materials substantially the same color.

EXAMPLE 29

71 grams of 2-amino-6-γ-cyanopropylsulfonylbenzothiazole were diazotized and the diazonium compound obtained was coupled with 43.5 grams of N-ethyl-N-β-cyanoethylaniline. Diazotization, coupling and recovery of the azo compound formed were carried out in accordance with the procedure described in Example 12. The azo compound obtained dyes linear polyester textile materials such as Dacron 54 or Kodel, fast bright red shades. It dyes cellulose acetate textile materials substantially the same color.

The compounds tabulated hereinafter further illustrate the compounds of our invention. These compounds are prepared by diazotizing the diazo components named hereinafter and coupling the diazonium compounds obtained with the coupling components named hereinafter. The color given is that which the compounds color Dacron 54 polyester textile materials. The diazotization, coupling and recovery operations are carried out in accordance with the procedure described hereinbefore.

*Table 1*

DIAZO COMPONENT: 2-AMINO-6-β-CYANOETHYLSULFONYLBENZOTHIAZOLE

| Coupling Component: | Color |
|---|---|
| 1. 2,5-dimethoxyaniline | Red. |
| 2. N-ethylaniline | Red. |
| 3. N-isopropylaniline | Red. |
| 4. N-ethyl-N-β-hydroxyethylaniline | Pink. |
| 5. N-ethyl-N-β-hydroxypropylaniline | Pink. |
| 6. N-n-propyl-N-β-hyroxyethylaniline | Pink. |
| 7. N-isobutyl-N-β-hydroxyethylaniline | Pink. |
| 8. N-n-butyl-N-γ-hydroxypropylaniline | Pink. |
| 9. N-β-hydroxyethylaniline | Red. |
| 10. N-β,γ-dihydroxypropylaniline | Red. |
| 11. N-β-hydroxypropylaniline | Red. |
| 12. N-δ-hydroxybutylaniline | Red. |
| 13. N,N-di-β-acetoxyethylaniline | Red. |
| 14. N-ethyl-N-β-cyanoethyl-m-toluidine | Pink. |
| 15. N-ethyl-N-β-cyanopropylaniline | Pink. |
| 16. N-ethyl-N-γ-cyanopropylaniline | Pink. |
| 17. N-ethyl-N-δ-cyanobutylaniline | Pink. |
| 18. N-ethyl-N-β-cyanoethyl-m-toluidine | Pink. |
| 19. N,N-di-β-acetoxyethyl-m-toluidine | Red. |
| 20. N,N-di-β-hydroxyethylaniline | Pink. |
| 21. N,N-di-β-hydroxypropylaniline | Pink. |
| 22. N,N-di-γ-hydroxypropylaniline | Pink. |
| 23. N,N-di-δ-hydroxybutylaniline | Pink. |
| 24. N-β-methoxyethylaniline | Red. |
| 25. N-β-ethoxyethylaniline | Red. |
| 26. N,N-di-β-methoxyethylaniline | Red. |
| 27. N,N-di-β-ethoxyethylaniline | Red. |
| 28. N - ethyl - N - β - carboethoxyethylaniline | Red. |
| 29. N,N-di-β-carboethoxyethylaniline | Red. |
| 30. N-β-phenylureidoethylaniline | Red. |
| 31. N - β - hydroxyethyl - N - β,β - difluoro-n-propylaniline | Red. |
| 32. N - β - hydroxyethyl - N - γ,γ - difluoropropylaniline | Red. |
| 33. N - β - hydroxyethyl - N - β,β,β - trifluoroethylaniline | Scarlet. |
| 34. N - β - hydroxyethyl - N - γ,γ,γ - trifluoropropylaniline | Scarlet. |
| 35. N - β - acetylaminoethyl - m - bromoaniline | Red. |
| 36. N - β - acetylaminoethyl - N - ethyl - m-chloroaniline | Scarlet. |
| 37. N - β - propionylaminoethyl - 2,5 - dimethoxyaniline | Red. |
| 38. N - β - ethylcarbamoylethyl - N - ethylaniline | Red. |
| 39. N-β-n-butylcarbamoylethylaniline | Red. |
| 40. N-β-methylsulfonamidoethylaniline | Red. |
| 41. N - β - methylcarbamoylethyl - m - anisidine | Pink. |

Table 2

DIAZO COMPONENT: 2-AMINO-6-CYANOMETHYL-SULFONYLBENZOTHIAZOLE

| Coupling Component: | Color |
|---|---|
| 1. Aniline | Orange. |
| 2. N-methylaniline | Scarlet. |
| 3. N-n-butylaniline | Scarlet. |
| 4. N-ethyl-N-$\beta$-cyanoethylaniline | Red. |
| 5. N-ethyl-N-$\beta$-cyanoethyl-m-chloroaniline | Red. |
| 6. N,N-di-$\beta$-cyanoethyl-2-methoxy-5-methylaniline | Red. |
| 7. N,N-di-$\beta$-hydroxyethylaniline | Pink. |
| 8. N-carbomethoxymethylaniline | Scarlet. |
| 9. N-carboethoxymethyl-m-chloroaniline | Scarlet. |
| 10. N-ethyl-N-$\beta$-ethoxyethylaniline | Red. |
| 11. N-ethyl-N-$\beta$-methoxyethyl-m-bromoaniline | Red. |
| 12. N-n-propyl-N-$\beta$-cyanoethyl-2,5-diethoxyaniline | Red. |
| 13. N-$\beta$-hydroxyethyl-N-$\beta$-ethoxyethyl-m-toluidine | Pink. |
| 14. N-$\beta$-hydroxyethyl-2,5-dimethylaniline | Scarlet. |
| 15. N-$b,\gamma$-dihydroxypropyl-2,5-diethylaniline | Red. |
| 16. N-$\beta$-carboethoxyethyl-$\beta$-hydroxyethylaniline | Red. |

Table 3

DIAZO COMPONENT: 2-AMINO-6-$\beta$-CYANOPROPYL-SULFONYLBENZOTHIAZOLE

| Coupling Component: | Color |
|---|---|
| 1. 2,5-diethoxyaniline | Scarlet. |
| 2. 2-methoxy-5-ethylaniline | Red. |
| 3. N-ethyl-N-$\beta$-cyanoethylaniline | Red. |
| 4. N-ethyl-N-$\beta$-cyanoethyl-m-toluidine | Pink. |
| 5. N-$\beta$-acetoxyethyl-N-$\beta$-cyanoethylaniline | Red. |
| 6. N-$\beta$-methoxyethyl-N-$\beta$-hydroxyethylaniline | Pink. |
| 7. N-$\beta$-ethoxyethyl-N-$\beta$-cyanoethylaniline | Red. |
| 8. N-$\beta$-hydroxypropyl-m-acetylaminoaniline | Scarlet. |
| 9. N-ethyl-N-$\delta$-cyanobutylaniline | Red. |
| 10. N-methyl-N-($\gamma$-chloro-$\beta$-hydroxypropyl)aniline | Red. |

Table 4

DIAZO COMPONENT: 2-AMINO-6-$\gamma$-CYANOPROPYL-SULFONYLBENZOTHIAZOLE

| Coupling Component: | Color |
|---|---|
| 1. o-Anisidine | Orange. |
| 2. N-ethyl-N-$\beta$-cyanoethylaniline | Red. |
| 3. N-ethyl-N-$\beta$-cyanoethyl-m-toluidine | Pink. |
| 4. N-$\beta$-acetoxyethyl-N-$\beta$-cyanoethylaniline | Red. |
| 5. N-$\beta$-acetoxyethyl-N-$\beta$-cyanoethyl-m-toluidine | Red. |
| 6. N,N-di-$\beta$-acetoxyethylaniline | Red. |
| 7. N-$\beta$-hydroxyethyl-N-$\beta$-cyanoethylaniline | Red. |
| 8. N-$\delta$-hydroxybutyl-N-$\beta$-cyanoethylaniline | Red. |
| 9. N-ethyl-N-$\beta,\gamma$-dihydroxypropylaniline | Red. |
| 10. N-methyl-N-$\delta$-cyanobutyl-m-toluidine | Red. |
| 11. N-($\gamma$-chloro-$\beta$-hydroxypropyl)-m-toluidine | Red. |

Table 5

DIAZO COMPONENT: 2-AMINO-6-$\delta$-CYANOBUTYL-SULFONYLBENZOTHIAZOLE

| Coupling Component: | Color |
|---|---|
| 1. o-Bromoaniline | Orange. |
| 2. o-Chloroaniline | Orange. |
| 3. o-Phenetidine | Scarlet. |
| 4. N-ethyl-N-$\beta$-cyanoethylaniline | Red. |
| 5. N-ethyl-N-$\beta$-cyanoethyl-m-toluidine | Pink. |
| 6. N-$\beta$-acetoxyethyl-N-$\beta$-cyanoethylaniline | Red. |
| 7. N-$\beta$-acetoxyethyl-N-$\beta$-cyanoethyl-m-toluidine | Red. |
| 8. N,N-di-$\beta$-acetoxyethylaniline | Red. |
| 9. N,N-di(carbomethoxymethyl)-m-toluidine | Scarlet. |
| 10. N,N-di(carboethoxymethyl)-m-chloroaniline | Scarlet. |
| 11. N-ethyl-N-$\beta$-hydroxyethyl-m-anisidine | Pink. |
| 12. N-ethyl-N-$\beta$-hydroxypropyl-m-phenetidine | Pink. |
| 13. N-$\beta$-phenylureido-N-$\beta$-hydroxyethylaniline | Red. |
| 14. N-$\beta$-cyanoethyl-N-$\beta$-ethoxyethylaniline | Red. |
| 15. N-ethyl-N-$\beta$-carbomethoxyethylaniline | Red. |
| 16. N-$\beta,\beta$-difluoroethylaniline | Orange. |

Any of the diazo components disclosed herein can be diazotized and coupled with any of the coupling components disclosed herein to form azo compounds of our invention. The azo compounds shown in Tables 1 to 5, inclusive, dye cellulose ester materials, such as cellulose acetate textile materials, bright shades generally similar to those obtained on Dacron 54 polyester textile materials.

The azo compounds of our invention do not have much affinity for wool and are more completely removed therefrom than the corresponding azo compounds containing a —SO$_2$alkyl group, such as —SO$_2$CH$_3$, for example, in the 6-position of the benzothiazole nucleus. Because of the property just noted the azo compounds of our invention are useful for the dyeing of linear polyester and wool blends, wherein staining of the wool is undesired.

The azo compounds of our invention are applied by known dyeing techniques to the linear polyester and cellulose ester materials noted hereinbefore. The azo compounds of our invention have varying utility as dyes. The degree of utility varies, for example, depending upon the material being colored and the formula of the azo compound.

The new monoazo compounds of our invention are relatively insoluble in water. They can be directly applied to linear polyester and cellulose ester materials, especially textile materials, in the form of an aqueous suspension which can be prepared by finely grinding them to a paste in the presence of a sulfonated oil, sodium lignin sulfonate, or other suitable dispersing agent and dispersing the resulting paste in water. In the case of polyester textile materials, such as linear aromatic polyesters having a melting point of at least 200° C., a dyeing assistant ordinarily referred to as a "carrier" may be used in the dyeing operation. Butyl benzoate, o-phenylphenol, p-phenylphenol, salicylic acid, methyl salicylate and benzoic acid are illustrative of the carriers that can be employed.

Polyester textile materials can be dyed by the methods described in U.S. Patents 2,757,064 and 2,880,050, for example.

Cellulose alkyl carboxylic acid ester textile materials can be dyed, for example, by the procedure described in U.S. Patent 2,785,157.

The invention has been described in detail with particular reference to preferred embodiments thereof, but it will be understood that variations and modifications can be effected within the spirit and scope of the invention as described hereinabove and as defined in the appended claims.

We claim:

1. The azo compounds having the formula:

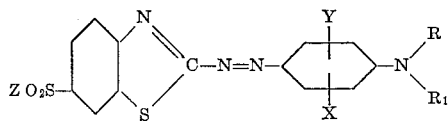

wherein R represents a member selected from the class consisting of a hydrogen atom, an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, β-chloroethyl, β-acetoxyethyl, carbomethoxymethyl, carboethoxymethyl, β-carbomethoxyethyl and β-carboethoxyethyl, $R_1$ represents a member selected from the class consisting of a hydrogen atom, an alkyl group having 1 to 4 carbon atoms, a hydroxyalkyl group having 2 to 4 carbon atoms, an alkoxyalkyl group having 3 to 4 carbon atoms, a cyanoalkyl group having 3 to 5 carbon atoms, β-chloroethyl, β-acetoxyethyl, carbomethoxymethyl, carboethoxymethyl, β-carbomethoxyethyl, β-carboethoxyethyl, β-phenylureidoethyl, γ-chloro-β-hydroxypropyl, β,β-difluoroethyl, β,β-difluoro-n-propyl, γ,γ-difluoropropyl, β,β,β-trifluoroethyl, γ,γ,γ-trifluoropropyl, a

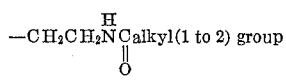

a β-alkyl(1 to 4)sulfonamidoethyl group and a β-alkyl-(1 to 4)carbamoylethyl group, X represents a member selected from the class consisting of a hydrogen atom, a bromine atom, a chlorine atom, methyl, ethyl, methoxy, ethoxy, acetylamino, n-propionylamino and n-butyrylamino, Y represents a member selected from the class consisting of a hydrogen atom, methyl, ethyl, methoxy and ethoxy, and Z represents a cyanoalkyl group having 2 to 5 carbon atoms.

2. The azo compounds having the formula:

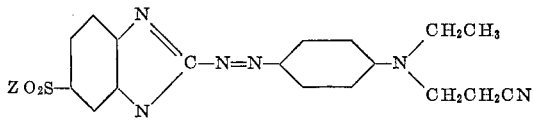

wherein Z represents a cyanoalkyl group having 2 to 5 carbon atoms.

3. The azo compounds having the formula:

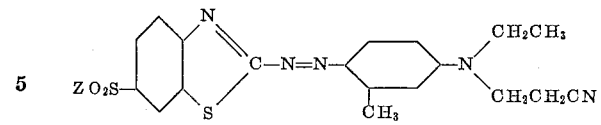

wherein Z represents a cyanoalkyl group having 2 to 5 carbon atoms.

4. The azo compounds having the formula:

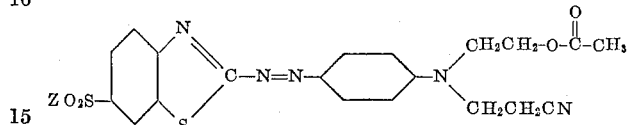

wherein Z represents a cyanoalkyl group having 2 to 5 carbon atoms.

5. The azo compounds having the formula:

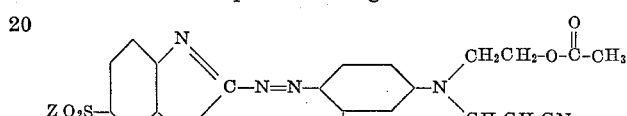

wherein Z represents a cyanoalkyl group having 2 to 5 carbon atoms.

6. The azo compounds having the formula:

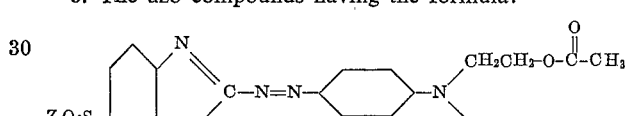

wherein Z represents a cyanoalkyl group having 2 to 5 carbon atoms.

7. The azo compound having the formula:

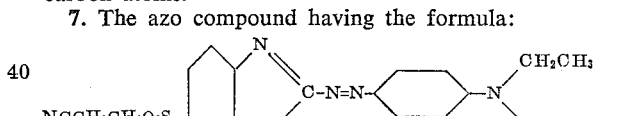

8. The azo compound having the formula:

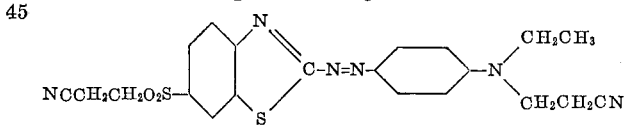

9. The azo compound having the formula:

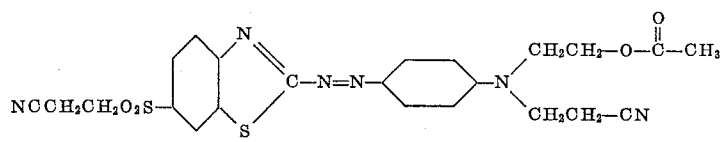

10. The azo compound having the formula:

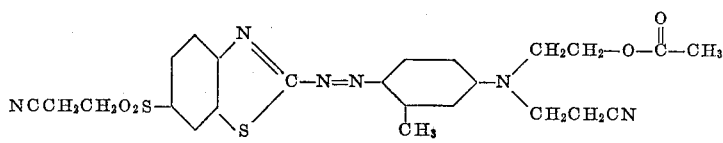

11. The azo compound having the formula:

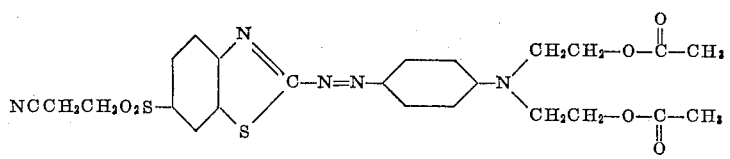

(References on following page)

References Cited by the Examiner

UNITED STATES PATENTS

| | | | |
|---|---|---|---|
| 2,096,722 | 10/1937 | Andersen | 260—148 |
| 2,785,157 | 3/1957 | Straley et al. | 260—158 |
| 2,868,775 | 1/1959 | Straley et al. | 260—158 X |
| 2,916,482 | 12/1959 | Straley et al. | 260—158 X |
| 2,955,901 | 10/1960 | Kruckenberg | 8—41 |
| 2,972,508 | 2/1961 | Kruchkenberg et al. | 8—41 |
| 3,007,915 | 11/1961 | Merian | 260—158 |
| 3,057,848 | 10/1962 | Dehn et al. | 260—158 |
| 3,097,196 | 7/1963 | Straley et al. | 260—158 X |

CHARLES B. PARKER, *Primary Examiner.*

A. LOUIS MONACELL, *Examiner.*

J. HERBERT, R. J. FINNEGAN, F. D. HIGEL,
*Assistant Examiners.*